G. H. SCANLAN.
TRACTION WHEEL.
APPLICATION FILED APR. 24, 1920.

1,389,460.

Patented Aug. 30, 1921.
2 SHEETS—SHEET 1.

WITNESSES

INVENTOR
George H. Scanlan.

G. H. SCANLAN.
TRACTION WHEEL.
APPLICATION FILED APR. 24, 1920.
1,389,460.
Patented Aug. 30, 1921.
2 SHEETS—SHEET 2.
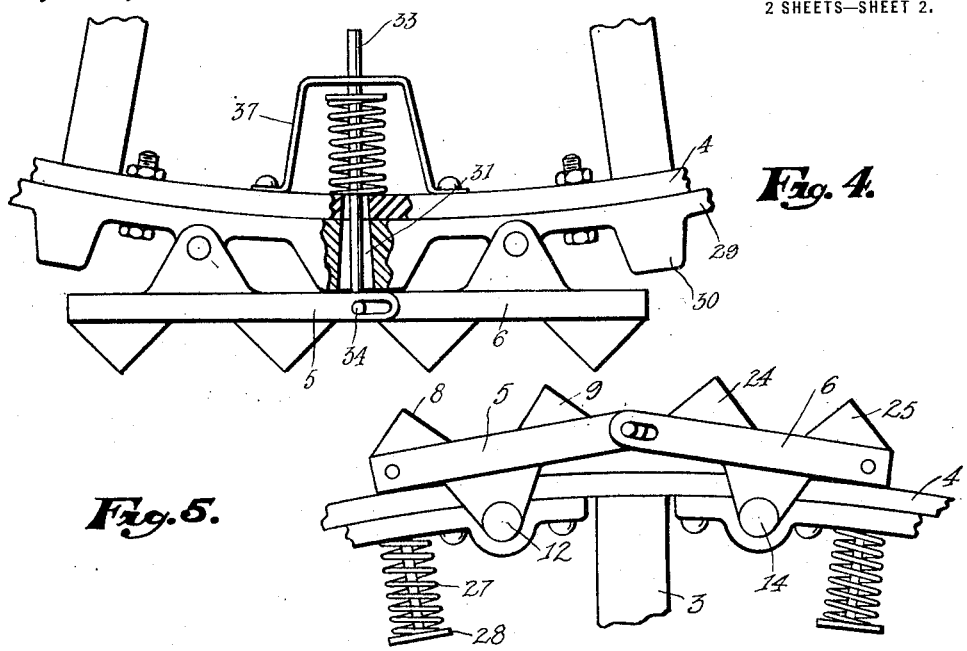
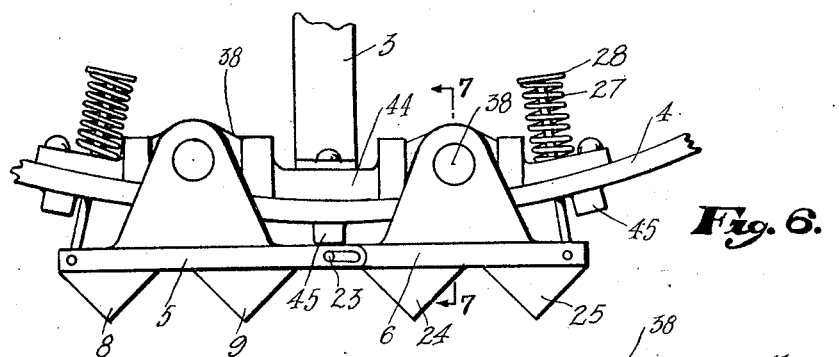
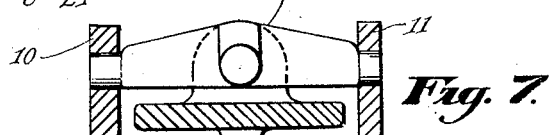
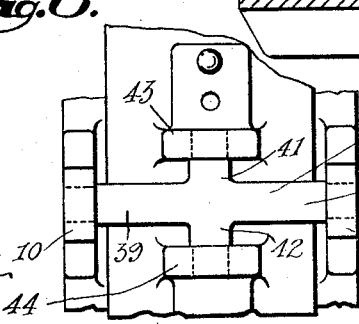
WITNESSES
A. L. Kitchin
INVENTOR
George H. Scanlan.

UNITED STATES PATENT OFFICE.

GEORGE H. SCANLAN, OF NEW YORK, N. Y.

TRACTION-WHEEL.

1,389,460. Specification of Letters Patent. Patented Aug. 30, 1921.

Application filed April 24, 1920. Serial No. 376,280.

*To all whom it may concern:*

Be it known that I, GEORGE H. SCANLAN, a citizen of the United States, and a resident of New York city, borough of Manhattan, in the county and State of New York, have invented a new and Improved Traction-Wheel, of which the followng s a full, clear, and exact description.

This invention relates to traction wheels, particularly to a traction wheel capable of use on tractors or other power devices and vehicles and has for an object the provision of a construction wherein a comparatively wide and long base is provided at all times so as to support the parts on comparatively soft ground.

Another object of the invention is to provide a traction wheel which utilizes pivotally mounted shoes and means for holding the shoes in position so as to engage and also leave the ground readily but present a comparatively large surface when in contact with the ground.

A still further object of the invention is to provide a traction wheel in which pivotally mounted shoes are used, and also means are provided for causing the shoes to yield in a forward and rearward direction in respect to the direction of the travel of the wheel, and also in a transverse direction thereto.

In the accompanying drawings:

Fig. 4 is a view similar to Fig. 2 but showing a slightly modified form of the invention.

Fig. 5 is a view similar to Fig. 2 but showing the shoes in their outer or released position.

Fig. 6 is a view similar to Fig. 2 but showing a slightly modified form of the invention.

Fig. 7 is a fragmentary sectional view through Fig. 6 on line 7—7.

Fig. 8 is a top plan view of the structure shown in Fig. 7.

Figure 1:
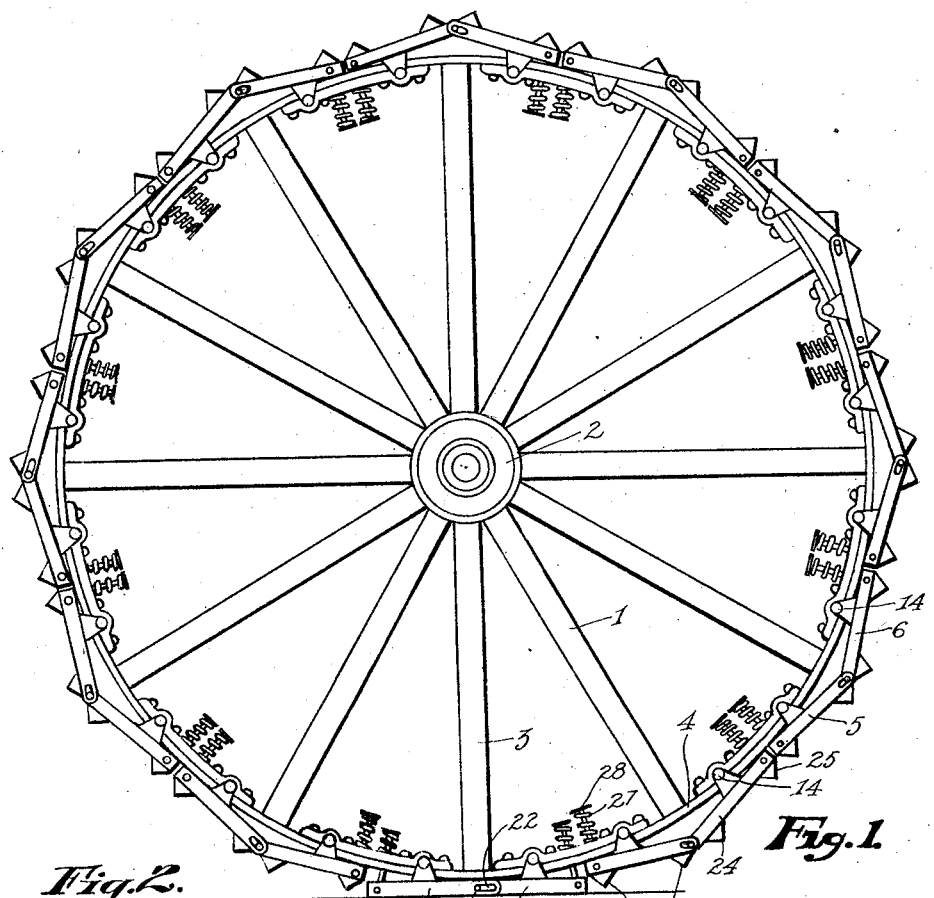
Figure 1 is a side view of a wheel disclosing an embodiment of the invention.
Figure 2:
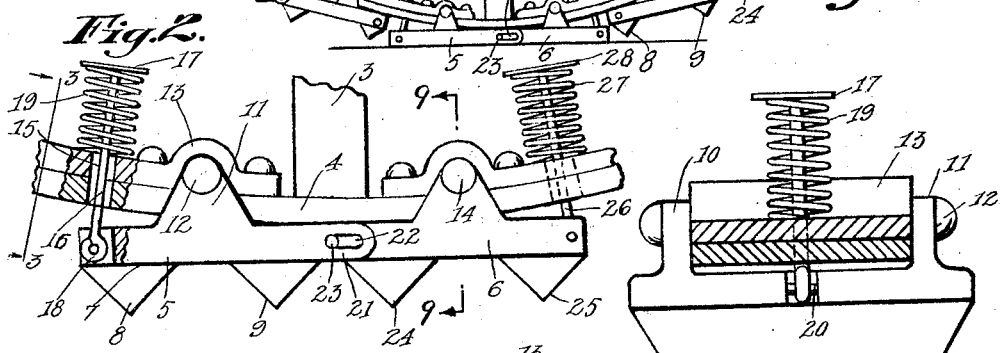
Fig. 2 is an enlarged fragmentary side view showing part of the wheel illustrated in Fig. 1, with certain parts broken away to better illustrate the detail construction of some of the parts.
Figure 3:
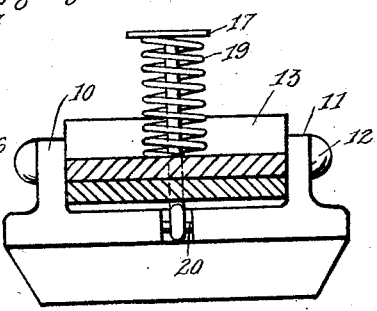
Fig. 3 is a fragmentary sectional view through Fig. 2 on line 3—3.
Figure 9:
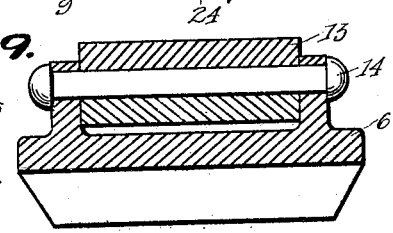
Fig. 9 is a fragmentary sectional view through Fig. 2 on line 9—9.

Referring to the accompanying drawings by numeral, 1 indicates a wheel which is provided with a hub 2 and a plurality of spokes 3, said spokes being secured to a rim 4 in any suitable manner. In order to make the wheel 1 operate properly on sand and soft earth without sinking to any appreciable depth therein, a plurality of shoes 5 and 6 are provided and mounted on the rim 4 so as to engage the earth flatwise when in use. These shoes may be of any width and also of any length, though, preferably, they are comparatively short in order to prevent any considerable raising of the wheel when shifting from one pair of shoes to the next adjacent pair. The shoe 5 is provided with a base 7 which may be flat or may be otherwise formed, as, for instance, with a number of transversely extending webs or lugs 8 and 9. Extending from the body of the shoe 5 in an opposite direction to the lugs 8 and 9 are ears 10 and 11. These ears accommodate a journaled pin 12 which extends through these ears and through one end of a bearing block 13, which bearing block is bolted or otherwise rigidly secured to the rim 4. The bearing block 13 has an opening for receiving the pin 12 of shoe 5 and the pin 14 of the next adjacent shoe 6, though, if desired, separate bearing blocks could be provided. As shown at the left in Fig. 2, an opening 15 is arranged in the block 13 and the rim 4 so as to accommodate the rod 16, which rod is provided with a shoulder or stop 17 at one end and an eye 18 at the opposite end. A compression spring 19 is arranged between block 13 and stop 17 so as to continually urge rod 16 in such a direction that eye 18 will tend to move toward the rim 4. Eye 18 accommodates a pin or rod 20 journaled in the end of shoe 5 so that whenever spring 19 is permitted to move rod 16, shoe 5 will be tilted from the position shown in Fig. 2 to the position shown in Fig. 5. The shoe 5 is provided with forwardly extending ears 21, each of said ears having a slot 22 therein so as to accommodate the pin 23, said pin being carried by the shoe 6, which shoe extends between the ears 21. In this way the shoes are connected together so as to act in unison but allowed free pivotal movement on their respective pins 12 and 14. The lower surface of the shoe 6 is preferably provided with webs or lugs 24 and 25 similar to lugs 8 and 9, while the end of the shoe 6 opposite the pin 23 is bifurcated similar to the shoe in Fig. 3 so as to accommodate the rod 26. This rod acts in a similar way to rod 16 and extends through an opening in the rim 4 so as to coact with the spring 27 and the stop 28 in a similar manner to the way spring acts. Whenever permitted the springs 19 and 27 cause the shoes 5 and 6 to quickly swing from the position shown in Fig. 2 to that shown in Fig. 5. In this way, the lugs 8 or 25 will first engage the earth and as either of the shoes is depressed, a corresponding movement will be conveyed to the next shoe so that the parts will operate as shown in Figs. 1 and 2 and present a wide and comparatively long base whereby the wheel will not readily sink into the earth. As the wheel 1 moves off of shoe 6 for instance, of one pair of shoes on to the shoe 5 of the next adjacent pair, there will be a slight raising of the wheel unless the earth is sufficiently soft to permit a slight depression thereof to accommodate the parts until they assume the horizontal position illustrated in Fig. 2. It will be noted that the springs 19 and 27 will resist the movement of the shoes to a horizontal position and will also assist the wheel in its movement when passing from one set of shoes to the other so that the resistance overcome in flattening out or moving to a horizontal position any pair of shoes will be returned in power to a large extent as the wheel moves.

In Fig. 4, there will be seen a slightly modified form of the invention, in which an angular auxiliary rim 29 is provided, said rim having a plurality of lugs or projections 30, certain of the lugs having apertures 31, registering with apertures 32 in rim 4. These apertures accommodate the rod 33 which is provided with a transverse pin 34 at the lower end, said pin passing through the respective shoes 5 and 6 in a similar manner to the way the pin 23 acts. The rod 33 is provided with a stop 35 rigidly secured thereto in any desired manner so that the spring 36 may be compressed between such stop and the rim 4, bracket 37 guiding the rod 33 in its movement. This arrangement will tend to cause the shoes 5 and 6 to remain as shown in Fig. 4 and when moved therefrom by engagement with the earth, spring 36 will be compressed.

In Figs. 6, 7 and 8 another modified form of the invention is shown which is similar to Fig. 2 but shows a different arrangement of connecting the ears 10 and 11 to the wheel. The connection shown consists of a substantially cross-shaped member 38 having journal extensions 39 and 40 rotatably mounted in the ears 10 and 11 and journal extensions 41 and 42 rotatably mounted in journal brackets 43 and 44 bolted or otherwise rigidly secured to the rim 4. As member 38 is allowed to swing on either set of the journal extensions, the respective shoes 5 and 6 may swing back and forth similar to that shown in Fig. 2 and also may swing transversely of the first swinging movement so as to take care of any slanting or leaning over of the wheel. The journal bracket 44 is preferably made with two journal sockets, as shown in Fig. 6, so as to receive journal extension 42 of member 38 associated with shoe 6 and also one of the journal extensions of member 38 associated with shoe 5. In addition, in this form of invention the rim 4 may be provided with a number of lugs 45 against which the ends of the shoes 5 and 6 press when in one position, whereby their swinging movement in one direction is limited. This arrangement requires longer ears 10 and 11 than the arrangement shown in Fig. 4. The construction for permitting leaning of the wheel without disturbing the engagement of the shoes 5 and 6 flatwise against the earth is of considerable advantage in fields which are not level and in which the soil is more or less soft.

I claim:

1. A device of the character described comprising a rim, a plurality of tread sections, a sliding and pivotal connection between each pair of tread sections, means for pivotally connecting said tread sections to said rim so as to swing in two directions at right angles to each other, and resilient means for resisting said swinging movement.

2. A device of the character described comprising a rim, a plurality of tread sections adapted to be held in alinement with the rim, a sliding and pivotal connection between each pair of tread sections, means for pivotally connecting the tread sections with the rim so that the tread sections will swing back and forth, resilient swinging members acting on said tread sections to resiliently cause one end of each tread section to normally remain in contact with the rim, and means for permitting a side or transverse swinging movement of the tread sections whereby the rim may lean so as to be out of the vertical line without disturbing the engagement of the tread section with the earth.

3. A device of the character described comprising a wheel body including a rim, a plurality of tread sections formed with ears, there being a pair of ears for each section, a cross-shaped journal member for journaling each section on said rim, two points of the journal member engaging said ears, journal brackets arranged on the rim and supporting the other extensions of said cross-shaped journal member, the last mentioned extensions extending peripherally of the rim, whereby each tread section may move pivotally in two directions, and spring means connected with one end of each tread section for resiliently holding said end adjacent said rim.

GEORGE H. SCANLAN.